(12) United States Patent
Yoshitake

(10) Patent No.: US 10,340,605 B2
(45) Date of Patent: Jul. 2, 2019

(54) PLANAR ANTENNA DEVICE

(71) Applicant: DENSO TEN Limited, Kobe-shi, Hyogo (JP)

(72) Inventor: Hiroaki Yoshitake, Kobe (JP)

(73) Assignee: DENSO TEN Limited, Kobe (JP)

( * ) Notice: Subject to any disclaimer, the term of this patent is extended or adjusted under 35 U.S.C. 154(b) by 3 days.

(21) Appl. No.: 15/896,236

(22) Filed: Feb. 14, 2018

(65) Prior Publication Data

US 2018/0287265 A1    Oct. 4, 2018

(30) Foreign Application Priority Data

Apr. 4, 2017    (JP) .................... 2017-074683

(51) Int. Cl.
| | | |
|---|---|---|
| *H01Q 1/32* | (2006.01) | |
| *H01Q 1/38* | (2006.01) | |
| *G01S 13/44* | (2006.01) | |
| *G01S 13/93* | (2006.01) | |
| *H01Q 21/00* | (2006.01) | |
| *H01Q 5/321* | (2015.01) | |
| *H01Q 5/371* | (2015.01) | |

(52) U.S. Cl.
CPC ....... *H01Q 21/0093* (2013.01); *G01S 13/931* (2013.01); *H01Q 1/3233* (2013.01); *H01Q 1/3283* (2013.01); *H01Q 1/38* (2013.01); *H01Q 5/321* (2015.01); *H01Q 5/371* (2015.01); *G01S 13/4445* (2013.01); *G01S 13/4454* (2013.01); *G01S 2013/9321* (2013.01); *G01S 2013/9375* (2013.01); *G01S 2013/9389* (2013.01); *H01Q 1/3275* (2013.01)

(58) Field of Classification Search
CPC .  H01L 27/10802; H01L 28/00; G11C 11/404; G11C 11/401; G11C 11/4096
USPC ............................. 343/702, 700 MS; 342/70
See application file for complete search history.

(56) References Cited

U.S. PATENT DOCUMENTS 5,815,112 A * 9/1998 Sasaki ................ G01S 13/87
                                                        342/113

FOREIGN PATENT DOCUMENTS

| JP | H05-121930 A | 5/1993 |
|---|---|---|
| JP | H05-63110 U | 8/1993 |
| JP | H10-209936 A | 8/1998 |
| JP | 2001-251208 A | 9/2001 |

\* cited by examiner

*Primary Examiner* — Khai M Nguyen
(74) *Attorney, Agent, or Firm* — Oliff PLC

(57) ABSTRACT

There is provided a planar antenna device having a first antenna and a second antenna arranged on a front surface of a substrate to be set in parallel to an up and down direction. The first antenna and the second antenna are arranged such that the magnitude of the difference between the lengths of predetermined sections of the transmission line parts becomes one of a positive odd multiple of a half wavelength of the guide wavelength of electric waves which can be transmitted in the transmission line parts and a positive even multiple of a half wavelength of the guide wavelength. The predetermined sections are provided in sections from the connection parts to the antenna elements.

12 Claims, 7 Drawing Sheets

PLANAR ANTENNA DEVICE

CROSS-REFERENCE TO RELATED APPLICATIONS

This application is based on and claims priority under 35 USC 119 from Japanese Patent Application No. 2017-74683 filed on Apr. 4, 2017.

BACKGROUND

Technical Field

The present disclosure relates to a planar antenna device.

Related Art

Patent Document 1 discloses a transceiver capable of effectively preventing occurrence of switching noise attributable to switching of antennae. The transceiver has a plurality of transmitting antennae or a plurality of receiving antennae, and switches the plurality of transmitting antennae or the plurality of receiving antennae by a switching means and transmits or receives signals. The lengths of lines between the switching means and the individual antennae are set to the same length such that the phases of reflected waves from the individual antennae to the switching means become the same phase.

[Patent Document 1] Japanese Patent Application Laid-Open No. 2001-251208

However, in an antenna substrate where a planar antenna is formed, if transmission lines connecting antenna elements such as radiation elements and MMICs (Monolithic Microwave Integrated Circuits) disposed together with the antenna elements on the same surface have curved shapes, unnecessary electric waves may be radiated. Also, in a configuration in which antenna elements are connected to waveguide converters by transmission lines on an antenna substrate, unnecessary electric waves may be radiated from the waveguide converters. Radiation of such unnecessary electric waves causes distortion to occur in beam patterns of the antennae. Especially, in the case where it is required to pass transmission lines around due to limitations of antenna configurations and substrate sizes, beam distortion attributable to radiation of unnecessary electric waves are likely to become a problem.

SUMMARY

It is therefore an object of the present disclosure to provide a planar antenna device capable of reducing distortion attributable to radiation of unnecessary electric waves.

According to an aspect of the embodiments of the present invention, there is provided a planar antenna device having a first antenna and a second antenna arranged on a front surface of a substrate to be set in parallel to an up and down direction. Each of the first antenna and the second antenna includes: a transmission line part configured to have one end electrically connected to a connection part provided on the front surface of the substrate and be able to transmit electric waves; and antenna elements connected to a side of a straight line part which is a part of the transmission line part and extends in the up and down direction. The first antenna and the second antenna are arranged such that the magnitude of the difference between the lengths of predetermined sections of the transmission line parts becomes one of a positive odd multiple of a half wavelength of the guide wavelength of electric waves which can be transmitted in the transmission line parts and a positive even multiple of a half wavelength of the guide wavelength, and the predetermined sections are provided in sections from the connection parts to the antenna elements.

In the planar antenna device, the first antenna may be a transmitting antenna for transmitting electric waves, the second antenna may be a receiving antenna for receiving electric waves, and the magnitude of the difference between the lengths of the predetermined sections may be a positive odd multiple of the half wavelength of the guide wavelength.

In the planar antenna device, both of the first antenna and the second antenna may be transmitting antennae or receiving antennae for an amplitude monopulse radar, and the magnitude of the difference between the lengths of the predetermined sections may be a positive odd multiple of the half wavelength of the guide wavelength.

In the planar antenna device, both of the first antenna and the second antenna may be receiving antennae for a phase monopulse radar, and the magnitude of the difference between the lengths of the predetermined sections may be a positive even multiple of the half wavelength of the guide wavelength.

In the planar antenna device, the transmission line parts may have curved parts positioned away from the antenna elements in a left-right direction, and the predetermined sections may be provided in sections from the curved parts to the antenna elements.

In the planar antenna device, the transmission line parts may have curved parts positioned away from the antenna elements in the up and down direction, and the predetermined sections may be provided in sections from the curved parts to the antenna elements.

In the planar antenna device, each of the first antenna and the second antenna may comprise: a plurality of straight line parts arranged in a left-right direction; and a connection part connecting the plurality of straight line parts. The transmission line parts may have curved parts positioned away from the antenna elements in the left-right direction, and the predetermined sections may be provided in sections from the curved parts to the connection parts.

In the planar antenna device, each of the first antenna and the second antenna may comprise: a plurality of straight line parts arranged in a left-right direction; and a connection part connecting the plurality of straight line parts. The transmission line parts may have curved parts positioned away from the antenna elements in the up and down direction, and the predetermined sections may be provided in sections from the curved parts to the connection parts.

In the planar antenna device, the connection parts may be waveguide conversion parts, the waveguide conversion parts may be positioned away from the antenna elements in a left-right direction, and the predetermined sections may be provided in sections from the waveguide conversion parts to the antenna elements.

In the planar antenna device, the connection pads may be waveguide conversion parts, the waveguide conversion parts may be positioned away from the antenna elements in the up and down direction, and the predetermined sections may be provided in sections from the waveguide conversion parts to the antenna elements.

In the planar antenna device, each of the first antenna and the second antenna may comprise: a plurality of straight line parts arranged in a left-right direction; and a connection part connecting the plurality of straight line parts. The connection parts may be waveguide conversion parts, the waveguide conversion parts may be positioned away from the antenna elements in a left-right direction, and the predetermined sections may be provided in sections from the waveguide conversion parts to the connection parts.

In the planar antenna device, each of the first antenna and the second antenna may comprise: a plurality of straight line parts arranged in a left-right direction; and a connection part connecting the plurality of straight line parts. The connection parts may be waveguide conversion parts, the waveguide conversion parts may be positioned away from the antenna elements in the up and down direction, and the predetermined sections may be provided in sections from the waveguide conversion parts to the connection parts.

According to the present disclosure, it is possible to provide a planar antenna device capable of reducing distortion attributable to radiation of unnecessary electric waves.

BRIEF DESCRIPTION OF THE DRAWINGS

Exemplary embodiments of the present invention will be described in detail based on the following figures, wherein.

DETAILED DESCRIPTION

Hereinafter, illustrative embodiments of the present invention will be described in detail with reference to the accompanying drawings.

1. Outline of Planar Antenna Device

Figure 1:
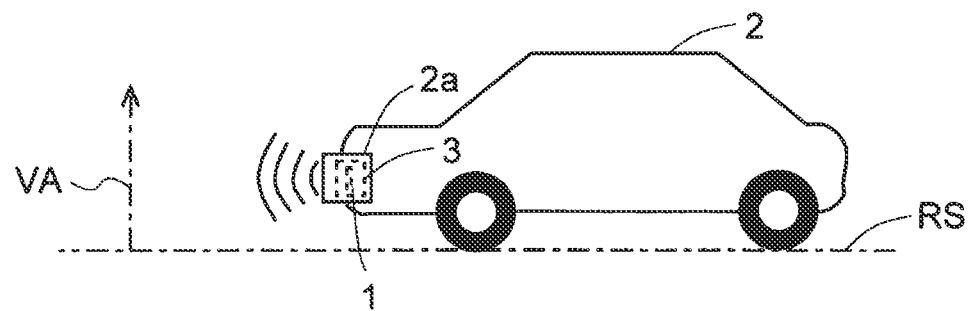
FIG. 1 is a schematic diagram for explaining an outline of a planar antenna device according to an embodiment of the present invention.

FIG. 1 is a schematic diagram for explaining an outline of a planar antenna device 1 according to an embodiment of the present invention. The planar antenna device 1 of the present embodiment is mounted on a radar device 3 for scanning the front of a vehicle 2. The radar device 3 is mounted inside a front bumper 2a of the vehicle 2. The planar antenna device 1 transmits electric waves of a millimeter wave band forward from the vehicle 2 through an exterior plate which is the front surface of the bumper 2a. Also, the planar antenna device 1 receives electric waves reflected by target objects such as preceding vehicles, oncoming vehicles, and installed roadside objects. The planar antenna device 1 is disposed inside a housing constituting the radar device 3 such that the front surface of a substrate having antennae formed thereon becomes perpendicular to a horizontal road surface RS (such that the front surface of the substrate becomes parallel to a vertical axis VA).

In this specification, in the case where the front surface of a substrate of a planar antenna device has been disposed perpendicular to a horizontal plane, a direction on the front surface of the substrate parallel to the horizontal plane is referred to as a left-right direction, and a direction on the front surface of the substrate perpendicular to the horizontal plane is referred to as an up and down direction. However, the up and down direction and the left-right direction are merely names for illustration, and do not limit actual positional relations and actual directions.

2. First Embodiment

Figure 2:
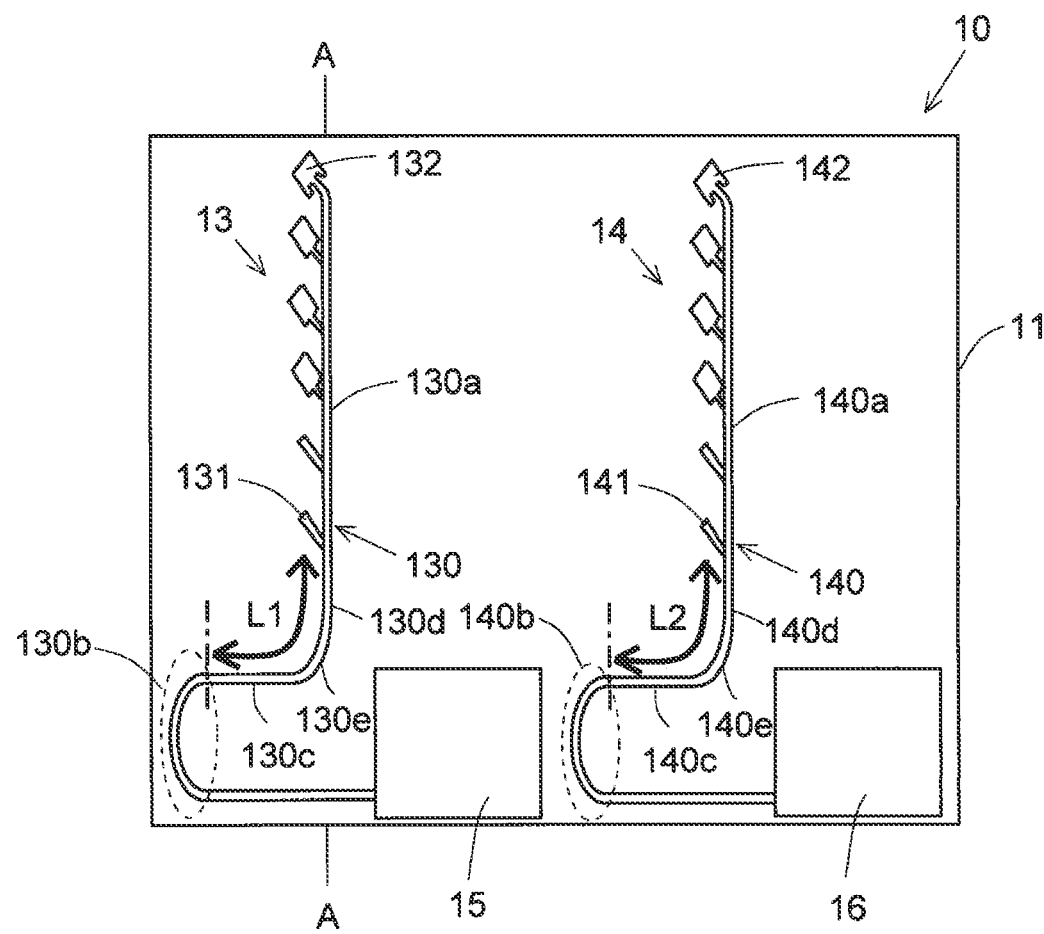
FIG. 2 is a plan view schematically illustrating the configuration of a planar antenna device according to a first embodiment.
Figure 3:
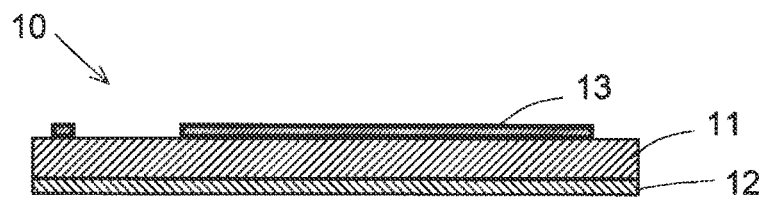
FIG. 3 is a schematic diagram illustrating a cross section taken along a line A-A of FIG. 2.

FIG. 2 is a plan view schematically illustrating the configuration of a planar antenna device 10 according to a first embodiment. FIG. 3 is a schematic diagram illustrating a cross-section taken along a line A-A of FIG. 2. As shown in FIGS. 2 and 3, the planar antenna device 10 includes a substrate 11, a ground 12, a first antenna 13, a second antenna 14, a first MMIC 15, and a second MMIC 16. The planar antenna device 10 has a configuration in which the first antenna 13 and the second antenna 14 are arranged on the front surface of the substrate 11 to be set in parallel to the up and down direction.

However, the planar antenna device 10 may further include a base plate supporting an antenna substrate configured by providing the ground 12 on the rear surface of the substrate 11. The base plate may be configured with a metal having a predetermined level of rigidity, such as aluminum.

The substrate 11 is a dielectric substrate. Specifically, the substrate 11 is configured with a flexible film made of a dielectric substance such as a fluoride resin or a liquid crystal polymer. The ground 12 is provided on the rear surface side of the substrate 11. The ground 12 and the antennae 13 and 14 may be metal foil able to be bonded to the substrate 11, such as copper foil. Alternatively, the ground 12 and the antennae 13 and 14 may be formed as thin film patterns of a conductive metal. The thin film patterns may be formed by forming thin films of copper or the like on the front surface and rear surface of the substrate 11 by a method such as sputtering or vapor deposition and performing patterning on the thin films by photo-etching or the like. The antennae 13 and 14 are microstrip antennae.

The MMICs 15 and 16 are high-frequency integrated circuits for performing signal processing such as oscillation, amplification, modulation, and frequency conversion of high-frequency signals. The MMICs 15 and 16 are disposed on the same surface of the substrate 11 as the surface where the antennae 13 and 14 are arranged. The MMICs 15 and 16 are mounted on the substrate 11 by flip-chip bonding. In the present embodiment, the first MMIC 15 and the second MMIC 16 are disposed at an interval in the left-right direction, and are positioned at the same height in the vertical direction.

Specifically, the first antenna 13 and the second antenna 14 are disposed in parallel at an interval in the left-right direction. The first antenna 13 has a transmission line part 130 and antenna elements 131, and the second antenna 14 has a transmission line part 140 and antenna elements 141. The transmission line parts 130 and 140 transmit electric waves. Also, ends of the transmission line parts 130 and 140 positioned on one side are electrically connected to connection parts provided on the front surface of the substrate 11. In the present embodiment, the connection parts are the MMICs 15 and 16. In other words, the one end of the first transmission line part 130 is electrically connected to the first MMIC 15. Also, the one end of the second transmission line part 140 is electrically connected to the second MMIC 16.

The antenna elements 131 and 141 are connected to sides of straight line parts 130a and 140a which are parts of the transmission line parts 130 and 140 and extend in the up and down direction. In the present embodiment, the antenna elements 131 and 141 are rectangular, and are connected, for example, at 45 degrees to the transmission line parts 130 and 140. The antenna elements 131 and 141 are arranged on sides of the straight line parts 130a and 140a positioned on one side (the left side). However, the antenna elements 131 and 141 may be arranged on both sides of the straight line parts 130a and 140a. Also, in the case of installing the antenna elements 131 and 141 on sides of the straight line parts 130a and 140a positioned on one side, they may be disposed on the opposite side to that of the present embodiment.

In the present embodiment, the plurality of antenna elements 131 and the plurality of antenna elements 141 are arranged in the up and down direction. In other words, the antennae 13 and 14 are one-dimensional array antennae. The plurality of antenna elements 131 and 141 aligned in the up and down direction is excited in phase. Each of the disposition intervals of the plurality of antenna elements 131 and 141 aligned in the up and down direction may be set to, for example, the same length as the guide wavelength of electric waves which can be transmitted in the corresponding transmission line part 130 or 140. Also, the numbers of the antenna elements 131 and 141 may be appropriately changed. Also, the antennae 13 and 14 may be two-dimensional array antennae having a number of one-dimensional array antennae arranged in the left-right direction.

In the present embodiment, the antennae 13 and 14 have end elements 132 and 142 for reflection suppression formed at the other ends of the transmission line parts 130 and 140. The end elements 132 and 142 may not be arranged in some cases.

In the present embodiment, the first antenna 13 is a transmitting antenna for transmitting electric waves. The second antenna 14 is a receiving antenna for receiving electric waves. In other words, the first transmission line part 130 is a power supply line for supplying electric power from a power source or the like. The first antenna elements 131 are radiation elements. The second antenna 14 is a power receiving line for transmitting received electric waves. The second antenna elements 141 are receiving elements configured to be excited if receiving electric waves. The first MMIC 15 has an oscillator unit for generating transmission signals of a millimeter wave band, and an amplifier unit for amplifying the transmission signals. The second MMIC 16 has an amplifier unit for amplifying reception signals, a frequency conversion unit for down-converting the reception signals, and an A/D conversion unit for converting the down-converted analog signals into digital signals.

The first antenna 13 and the second antenna 14 are arranged such that the lengths of predetermined sections of the transmission line parts 130 and 140 have a difference according to the half wavelength of the guide wavelength of electric waves which can be transmitted in the transmission line parts 130 and 140. The predetermined sections are provided in sections from the connection parts to the antenna elements 131 and 141. In other words, in the first antenna 13, the predetermined section is provided in a section from the first MMIC 15 to a first antenna element 131. In the second antenna 14, the predetermined section is provided in a section from the second MMIC 16 to a second antenna element 141. Also, in the present embodiment, the plurality of antenna elements 131 and the plurality of antenna elements 141 are provided in the up and down direction. In this case, the antenna elements 131 and 141 which determine the above-mentioned sections mean antenna elements 131 and 141 closest to the connection parts 15 and 16 along the transmission line parts 130 and 140.

In the present embodiment, the lengths of parts of the transmission line parts 130 and 140 where unnecessary electric waves may be radiated are set so as to be different depending on a half wavelength of the guide wavelength on both sides of the first antenna 13 and the second antenna 14. Therefore, it is possible to reduce distortion attributable to unnecessary electric waves.

In the present embodiment, more specifically, the magnitude of the difference between the lengths of the predetermined sections is a positive odd multiple of the half wavelength of the guide wavelength. In other words, the magnitude Δ of the difference between the lengths of the predetermined sections satisfies the following expression (1).

$$\Delta = 1/2 \times \lambda g \times (2n+1) \tag{1}$$

Here, λg is the guide wavelength when electric waves of a use frequency are transmitted in the transmission line parts, and n is an integer of 0 or greater.

Therefore, it is possible to reduce distortion of the patterns of transmission/reception synthetic beams obtained by multiplying the patterns of beams transmitted from the transmitting antenna 13 and the patterns of beams received by the receiving antenna 14. In other words, in the planar antenna device 1, it becomes possible to suppress the influence of radiation of unnecessary electric waves such that it is possible to perform appropriate beam scanning. This will be described below in more detail. In the following description, radiation of unnecessary electric waves will also be referred to simply as unnecessary radiation.

In the present embodiment, as shown in FIG. 2, the transmission line parts 130 and 140 have curved parts 130b and 140b positioned away from the antenna elements 131 and 141 in the left-right direction. The predetermined sections described above are sections from the curved parts 130b and 140b to the antenna elements 131 and 141. In the present embodiment, the curved parts 130b and 140b are provided intentionally at positions away from the antenna elements 131 and 141 in the horizontal direction. Therefore, it is possible to reduce distortion of the beam patterns of transmission/reception synthetic beams in the horizontal direction.

Specifically, the first transmission line part 130 has the first curved part 130b provided in a U shape at a position away to the left from the first antenna elements 131. The second transmission line part 140 has the second curved part 140b provided in a U shape at a position away to the left from the second antenna elements 141. The first curved part 130b and the second curved part 140b have the same size and the same shape. However, the curved parts 130b and 140b may be provided at positions away to the right from the antenna elements 131 and 141, not to the left side.

In the first transmission line part 130, the predetermined section is from the first curved part 130b to the first antenna elements 131. In the second transmission line part 140, the predetermined section is from the second curved part 140b to the second antenna elements 141. Specifically, the length L1 of the predetermined section of the first transmission line part 130 is the distance from the upper end of the first curved part 130b to the lowest first antenna element 131. The length L2 of the predetermined section of the second transmission line part 140 is the distance from the upper end of the second curved part 140b to the lowest second antenna element 141.

The magnitude of the difference between the length L1 of the predetermined section and the length L2 of the predetermined section is set to a positive odd multiple of the half wavelength of the guide wavelength λg. In the present embodiment, the predetermined sections include straight line parts 130c and 140c connected to the curved parts 130b and 140b and extending in the left-right direction, straight line parts 130d and 140d connected to the lowest antenna elements 131 and 141 and extending in the up and down direction, and curved parts 130e and 140e connecting the straight line parts. The difference between the length L1 and the length L2 may be obtained by making a length difference between each of the pairs of parts. Also, the difference between the length L1 and the length L2 may be obtained by making a length difference between each of one or two of the pairs of parts. For example, simply, a difference may be made between the lengths of the straight line parts 130d and 140d extending in the up and down direction such that the positions of the first antenna elements 131 and the second antenna elements 141 in the up and down direction deviate from each other by the half wavelength of the guide wavelength λg.

Also, in the present embodiment, the length L1 is set to be longer than the length L2; however, this is merely an example. The length L2 may be set to be longer than the length L1.

In the case where electric waves are transmitted in the curved parts 130b and 140b, unnecessary electric waves are likely to be radiated. Such unnecessary radiation is more likely to occur as the curvature radius R of the curves increases (the curves are steeper). For example, in the case where there are limitations on the size of the substrate 11 and the like, the R of the curves of the transmission lines passed around is likely to increase, and unnecessary radiation is likely to occur. Like this, as the curvature radius R of the curves of the transmission lines decreases from a predetermined value, unnecessary radiation is more likely to occur and cause distortion to occur in beam patterns of the transmitting antenna 13 and the receiving antenna 14. Further, like the present embodiment, if the distances in the left-right direction between the antenna elements 131 and 141 and the curved parts 130b and 140b where unnecessary electric waves can be radiated are set to be large, large distortion is likely to occur in beam patterns in the horizontal direction.

Figure 4:
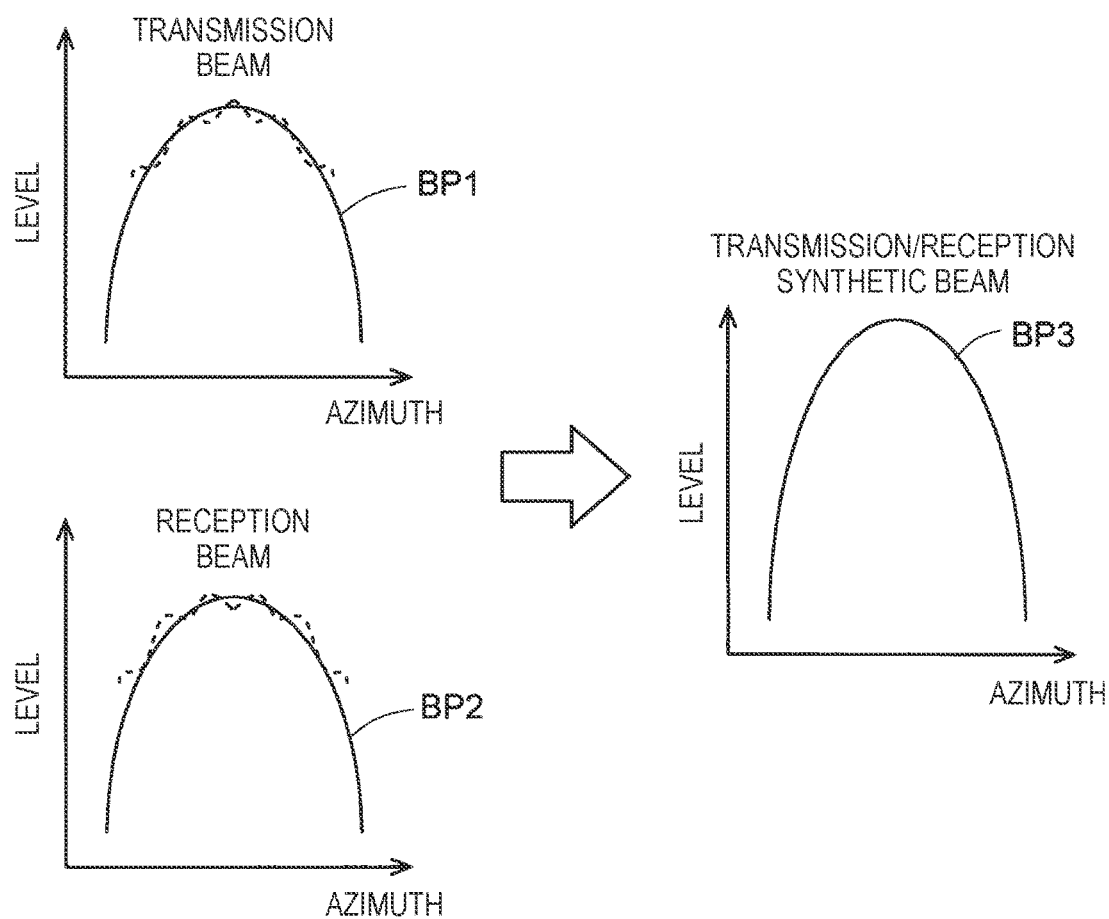
FIG. 4 is a schematic diagram for explaining an effect of the first embodiment.

FIG. 4 is a schematic diagram for explaining an effect of the first embodiment. In FIG. 4, beam patterns in the horizontal direction are shown. As shown in FIG. 4, in the case of the pattern BP1 of horizontal beams which are transmitted from the transmitting antenna 13, if a noise pattern attributable to unnecessary radiation is superimposed, distortion occurs, and the beam pattern becomes a pattern as shown by a broken line. Also, in the case of the pattern BP2 of horizontal beams which are received by the receiving antenna 14, if a noise pattern attributable to unnecessary radiation is superimposed, distortion occurs, and the beam pattern becomes a pattern as shown by a broken line.

In the transmission beam pattern BP1 and the reception beam pattern BP2, positions where distortion occurs vary according to the phase of power exciting the antenna elements 131 and 141. If the lengths of parts of the transmission line parts 130 and 140 from unnecessary-electric-wave occurrence parts (in this example, the curved parts 130b and 140b) to the antenna elements 131 and 141 are set to odd multiples of the half wavelength of the guide wavelength λg, the phase of the exciting power is shifted by half of a cycle. As a result, the appearance of distortion changes at the timing of shifting. Specifically, in the beam patterns BP1 and BP2, the positions of peaks and troughs which occur as distortion are inverted at the shifting of the phase.

In the present embodiment, the lengths L1 and L2 of the parts of the transmitting antenna 13 and the receiving antenna 14 from the unnecessary-electric-wave occurrence parts to the antenna elements are different, and the magnitude of the difference between them is an odd multiple of the half wavelength of the guide wavelength λg. Therefore, the positions of peaks and troughs in distortion which occurs in the transmission beam pattern BP1 in the horizontal direction are opposite to those in distortion which occurs in the reception beam pattern BP2 in the horizontal direction. As a result, distortion which occurs in the transmission beam pattern BP1 is weakened by distortion which occurs in the reception beam pattern BP2. In other words, as shown in FIG. 4, a transmission/reception synthetic beam pattern BP3 in the horizontal direction becomes a fine pattern with reduced distortion.

In the present embodiment, in the case where it is required to pass the transmission lines of the antennae 13 and 14 around on the front surface (upper surface) of the substrate 11, some unnecessary radiation can be intentionally caused in the transmitting antenna 13 and the receiving antenna 14 such that the influence of unnecessary radiation is suppressed as the whole. Also, in the present embodiment, since it is possible to suppress the influence of unnecessary radiation by adjusting the lengths of the predetermined sections of the transmission line parts 130 and 140, it is possible to omit covering the unnecessary-electric-wave occurrence parts with a cover in order to suppress unnecessary radiation. Also, in the present embodiment, since it is possible to dispose the unnecessary-electric-wave occurrence parts on the front surface of the substrate 11, the structure of the planar antenna device 10 is prevented from becoming complicated.

3. Second Embodiment

A second embodiment is a configuration suppressing distortion of transmission/reception synthetic beam patterns in the horizontal direction, similarly to the first embodiment. The components and effects identical to those of the first embodiment will not be described as long as a description thereof is not especially required.

Figure 5:
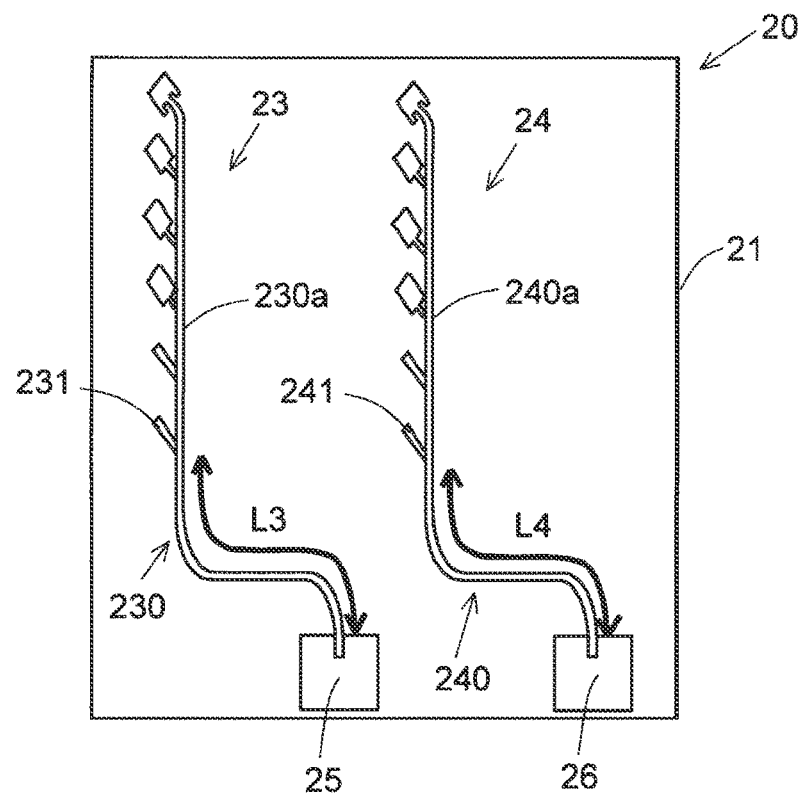
FIG. 5 is a plan view schematically illustrating the configuration of a planar antenna device according to a second embodiment.
Figure 6:
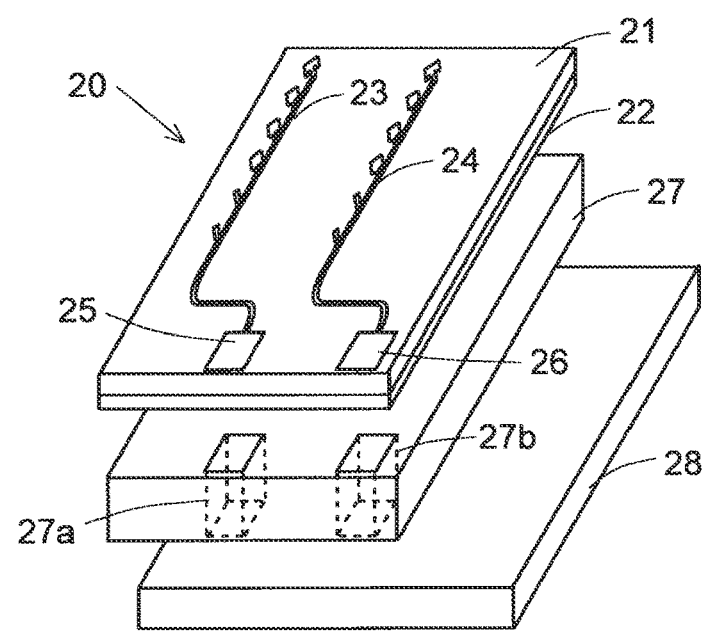
FIG. 6 is an exploded perspective view schematically illustrating the configuration of the planar antenna device according to the second embodiment.

FIG. 5 is a plan view schematically illustrating the configuration of a planar antenna device 20 according to the second embodiment. FIG. 6 is an exploded perspective view schematically illustrating the configuration of the planar antenna device 20 according to the second embodiment. As shown in FIGS. 5 and 6, the planar antenna device 20 includes a substrate 21, a ground 22, a first antenna 23, a second antenna 24, a first waveguide conversion part 25, a second waveguide conversion part 26, a housing 27, and a circuit board 28.

The substrate 21 and the ground 22 have the same configurations as those of the first embodiment, and a description thereof will not be made. Also, the antennae 23 and 24 are almost the same as those of the first embodiment. Parts identical to those of the first embodiment will not be described, and different parts will be mainly described below.

In the present embodiment, MMICs (not shown in the drawings) are disposed on the circuit board 28, not on the front surface of the substrate 21 where the antennae 23 and 24 are formed. This point is different from the first embodiment. Due to this configuration difference, the planar antenna device 20 includes the waveguide conversion parts 25 and 26, and the housing 27 acting as a waveguide. The waveguide conversion parts 25 and 26 are configured by providing conductive members on the front surface side of the substrate 21. In the present embodiment, the waveguide conversion parts 25 and 26 are rectangular.

The housing 27 is a cuboid block body configured with a conductive material such as aluminum, and has two hollow parts 27a and 27b formed through the block body in a direction perpendicular to the front surface of the substrate 21. The two hollow parts 27a and 27b disposed at an interval in the left-right direction propagate electric waves. The housing 27 is bonded to the substrate 21 with the ground 22 interposed therebetween. The first waveguide conversion part 25 is provided at a position corresponding to the first hollow part 27a. The second waveguide conversion part 26 is provided at a position corresponding to the second hollow part 27b. The waveguide conversion parts 25 and 26 perform transmission power conversion between the housing 27 and the antennae 23 and 24. The opposite side of the housing 27 to the side bonded to the substrate 21 is bonded to the circuit board 28. Therefore, the antennae 23 and 24 and the MMICs are connected by waveguide connection via the housing 27.

The first antenna 23 has a transmission line part 230 and antenna elements 231, and the second antenna 24 has a transmission line part 240 and antenna elements 241. Ends of the transmission line parts 230 and 240 positioned on one side are electrically connected to connection parts provided on the front surface of the substrate 21. In the present embodiment, the connection parts are the waveguide conversion parts 25 and 26. In other words, the corresponding end of the first transmission line part 230 is electrically connected to the first waveguide conversion part 25. Also, the corresponding part of the second transmission line part 240 is electrically connected to the second waveguide conversion part 26. The antenna elements 231 and 241 are connected to sides of straight line parts 230a and 240a which are parts of the transmission line parts 230 and 240 and extend in the up and down direction.

The waveguide conversion parts 25 and 26 are positioned away from the antenna elements 231 and 241 in the left-right direction. Specifically, the first waveguide conversion part 25 is positioned away to the right from the first antenna elements 231. The second waveguide conversion part 26 is positioned away to the right from the second antenna elements 241. The configuration in which the waveguide conversion parts 25 and 26 are away from the antenna elements 231 and 241 in the left-right direction is realized since the transmission line parts 230 and 240 have S-shaped parts. However, the waveguide conversion parts 25 and 26 may be configured so as to be away to the left from the antenna elements 231 and 241.

Even in the present embodiment, similarly to the first embodiment, the first antenna 23 is a transmitting antenna for transmitting electric waves. The second antenna 24 is a receiving antenna for receiving electric waves. Further, similarly in the first embodiment, the first antenna 23 and the second antenna 24 are arranged such that the magnitude of the difference between the lengths of predetermined sections of the transmission line parts 230 and 240 becomes a positive odd multiple of a half wavelength of the guide wavelength $\lambda g$ of electric waves which can be transmitted in the transmission line parts 230 and 240.

However, in the present embodiment, the predetermined sections are from the waveguide conversion parts 25 and 26 to the antenna elements 231 and 241. Specifically, in the first transmission line part 230, the predetermined section is from the first waveguide conversion part 25 to the first antenna elements 231. In the second transmission line part 240, the predetermined section is from the second waveguide conversion part 26 to the second antenna elements 241. Specifically, the length L3 of the predetermined section of the first transmission line part 230 is the distance from the center of the upper end of the first waveguide conversion part 25 to the lowest first antenna element 231. The length L4 of the predetermined section of the second transmission line part 240 is the distance from the center of the upper end of the second waveguide conversion part 26 to the lowest second antenna element 241. The difference between the length L3 of the predetermined section and the length L4 of the predetermined section may be made at any parts in S-shaped predetermined sections. For example, the difference may be made between straight line parts connected to the antenna elements 231 and 241. Also, in the present embodiment, the length L3 is longer than the length L4; however, the length L4 may be longer than the length L3.

In the case where electric waves are propagated in the waveguides, unnecessary electric waves are likely to be radiated. Such unnecessary radiation causes distortion in beam patterns of the transmitting antenna 23 and the receiving antenna 24. Further, like the present embodiment, if the distances in the left-right direction between the antenna elements 231 and 241 and the waveguide conversion parts 25 and 26 where unnecessary electric waves can be radiated are set to be large, large distortion is likely to occur in beam patterns in the horizontal direction.

In the present embodiment, the waveguide conversion parts 25 and 26 are provided intentionally away from the antenna elements 231 and 241 in the left-right direction such that unnecessary radiation is likely to occur in the horizontal direction. Further, similarly to the first embodiment, the transmitting antenna 23 and the receiving antenna 24 are arranged such that the magnitude of the difference between the lengths L3 and L4 from unnecessary-electric-wave occurrence parts to the antenna elements becomes an odd multiple of a half wavelength of the guide wavelength $\lambda g$. Therefore, the positions of peaks and troughs in distortion which occurs in a transmission beam pattern in the horizontal direction are opposite to those in distortion which occurs in a reception beam pattern in the horizontal direction. As a result, distortion which occurs in the transmission beam pattern is weakened by distortion which occurs in the reception beam pattern. As a result, a transmission/reception synthetic beam pattern in the horizontal direction becomes a fine pattern with reduced distortion.

4. Third Embodiment

Similarly to the first embodiment, a third embodiment has a configuration suppressing the influence of unnecessary radiation attributable to curved parts in order to reduce distortion of transmission/reception synthetic beam patterns. However, the third embodiment is different from the first embodiment in that it has a configuration in which distortion of transmission/reception synthetic beam patterns in the vertical direction, not in the horizontal direction, is reduced. The components and effects identical to those of the first embodiment will not be described as long as a description thereof is not especially required.

Figure 7:
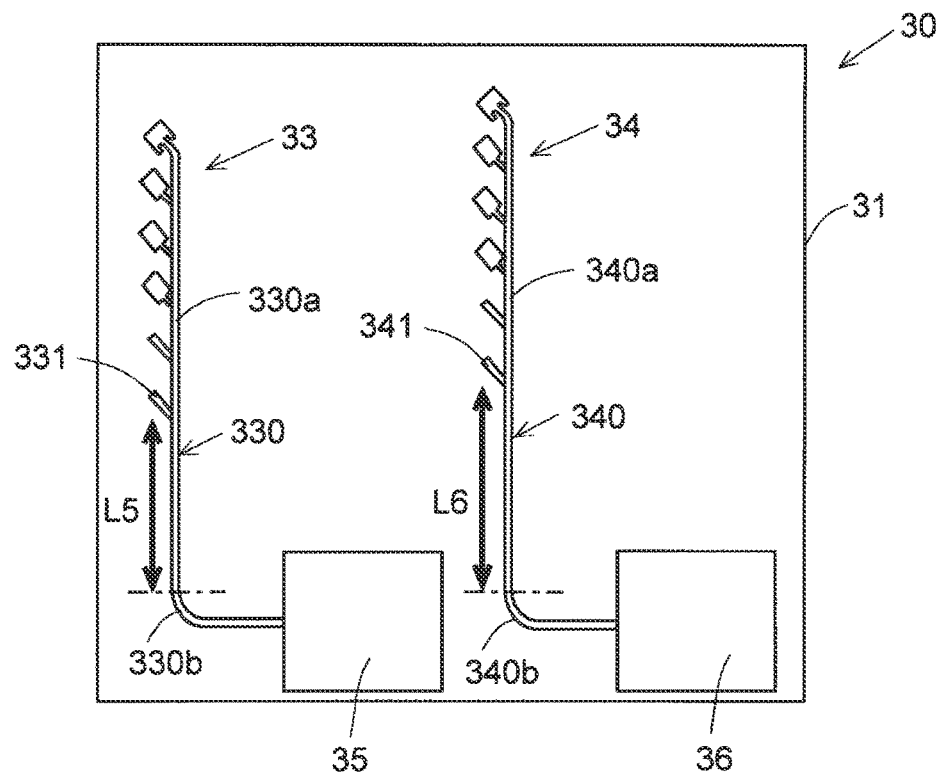
FIG. 7 is a plan view schematically illustrating the configuration of a planar antenna device according to a third embodiment.

FIG. 7 is a plan view schematically illustrating the configuration of a planar antenna device 30 according to the third embodiment. As shown in FIG. 7, the planar antenna device 30 includes a first antenna 33, a second antenna 34, a first MMIC 35, and a second MMIC 36, which are arranged on the front surface of a substrate 31. The MMICs 35 and 36 are examples of connection parts of the present invention.

The first antenna 33 has a transmission line part 330 and antenna elements 331, and the second antenna 34 has a transmission line part 340 and antenna elements 341. Specifically, one end of the first transmission line part 330 is electrically connected to the first MMIC 35. Also, one end of the second transmission line part 340 is electrically connected to the second MMIC 36. The antenna elements 331 and 341 are connected to sides of straight line parts 330a and 340a which are parts of the transmission line parts 330 and 340 and extend in the up and down direction.

Even in the present embodiment, similarly to the first embodiment, the first antenna 33 is a transmitting antenna for transmitting electric waves. The second antenna 34 is a receiving antenna for receiving electric waves. Further, similarly to the first embodiment, the first antenna 33 and the second antenna 34 are provided such that the magnitude of the difference between the lengths of predetermined sections of the transmission line parts 330 and 340 becomes a positive odd multiple of a half wavelength of the guide wavelength $\lambda g$ of electric waves which can be transmitted in the transmission line parts 330 and 340.

In the present embodiment, the transmission line parts 330 and 340 have curved parts 330b and 340b positioned away from the antenna elements 331 and 341 in the up and down direction. Specifically, the first transmission line part 330 has a first curved part 330b positioned away downward from the lowest first antenna element 331. The second transmission line part 340 has a second curved part 340b positioned away downward from the lowest second antenna element 341. The first curved part 330b and the second curved part 340b have the same size and the same shape. However, the first curved part 330b and the second curved part 340b may have different sizes and shapes as long as the magnitude of the difference between the lengths of predetermined sections of the transmission line parts 330 and 340 becomes a positive odd multiple of a half wavelength of the guide wavelength $\lambda g$ of electric waves which can be transmitted in the transmission line parts 330 and 340.

Also, in the present embodiment, the predetermined sections are from the curved parts 330b and 340b to the antenna elements 331 and 341. Specifically, in the first transmission line part 330, the predetermined section is a straight line section from the first curved part 330b to the first antenna elements 331. In the second transmission line part 340, the predetermined section is a straight line section from the second curved part 340b to the second antenna elements 341. Specifically, the length L5 of the predetermined section of the first transmission line part 330 is the distance from the upper end of the first curved part 330b to the lowest first antenna element 331. The length L6 of the predetermined section of the second transmission line part 340 is the distance from the upper end of the second curved part 340b to the lowest second antenna element 341. Also, in the present embodiment, the length L6 is longer than the length L5; however, the length L5 may be longer than the length L6.

In the case where electric waves are propagated in the curved parts 330b and 340b, unnecessary electric waves are likely to be radiated. Such unnecessary radiation causes distortion in beam patterns of the transmitting antenna 33 and the receiving antenna 34. Further, like the present embodiment, if the distances between the antenna elements 331 and 341 and the curved parts 330b and 340b where unnecessary electric waves can be radiated are set to be large, large distortion is likely to occur in beam patterns in the vertical direction.

In the present embodiment, the curved parts 330b and 340b are provided intentionally away from the antenna elements 331 and 341 in the up and down direction such that unnecessary radiation is likely to occur in the vertical direction. Further, similarly in the first embodiment, the transmitting antenna 33 and the receiving antenna 34 are arranged such that the magnitude of the difference between the lengths L5 and L6 from the unnecessary-electric-wave occurrence parts to the antenna elements becomes an odd multiple of a half wavelength of the guide wavelength $\lambda g$. Therefore, the positions of peaks and troughs in distortion which occurs in a transmission beam pattern in the vertical direction are opposite to those in distortion which occurs in a reception beam pattern in the vertical direction. As a result, distortion which occurs in the transmission beam pattern is weakened by distortion which occurs in the reception beam pattern. As a result, a transmission/reception synthetic beam pattern in the vertical direction becomes a fine pattern with reduced distortion.

4. Fourth Embodiment

Similarly to the second embodiment, a fourth embodiment is a configuration suppressing the influence of unnecessary radiation attributable to waveguide conversion parts in order to reduce distortion of transmission/reception synthetic beam patterns. However, the fourth embodiment is different from the second embodiment in that it has a configuration in which distortion of transmission/reception synthetic beam patterns in the vertical direction, not in the horizontal direction, is reduced. The components and effects identical to those of the second embodiment will not be described as long as a description thereof is not especially required.

Figure 8:
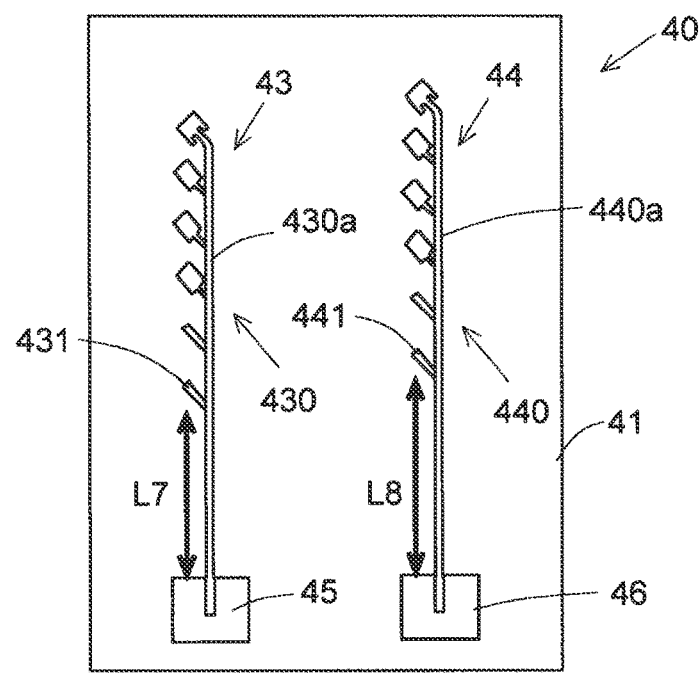
FIG. 8 is a plan view schematically illustrating the configuration of a planar antenna device according to a fourth embodiment.

FIG. 8 is a plan view schematically illustrating the configuration of a planar antenna device 40 according to the fourth embodiment. As shown in FIG. 8, the planar antenna device 40 includes a first antenna 43, a second antenna 44, a first waveguide conversion part 45, and a second waveguide conversion part 46, which are provided on the front surface of a substrate 41.

The first antenna 43 has a transmission line part 430 and antenna elements 431, and the second antenna 44 has a transmission line part 440 and antenna elements 441. Ends of the transmission line parts 430 and 440 positioned on one side are electrically connected to connection parts provided on the front surface of the substrate 41. In the present embodiment, the connection parts are the waveguide conversion parts 45 and 46. In other words, specifically, the corresponding end of the first transmission line part 430 is electrically connected to the first waveguide conversion part 45. Also, the corresponding end of the second transmission line part 440 is electrically connected to the second waveguide conversion part 46. The antenna elements 431 and 441 are connected to sides of straight line parts 430a and 440a which are parts of the transmission line parts 430 and 440 and extend in the up and down direction.

The waveguide conversion parts 45 and 46 are positioned away from the antenna elements 431 and 441 in the up and down direction. Specifically, the first waveguide conversion part 45 is positioned away downward right from the first antenna elements 431. The second waveguide conversion part 46 is positioned away downward from the second antenna elements 441. The configuration in which the waveguide conversion parts 45 and 46 are away from the antenna elements 431 and 441 in the up and down direction is realized since the transmission line parts 430 and 440 have the straight line parts extending in the up and down direction.

Even in the present embodiment, similarly to the second embodiment, the first antenna 43 is a transmitting antenna for transmitting electric waves. The second antenna 44 is a receiving antenna for receiving electric waves. Further, similarly to the second embodiment, the first antenna 43 and the second antenna 44 are arranged such that the magnitude of the difference between the lengths of predetermined sections of the transmission line parts 430 and 440 becomes a positive odd multiple of a half wavelength of the guide wavelength $\lambda g$ of electric waves which can be transmitted in the transmission line parts 430 and 440.

In the present embodiment, the predetermined sections are from the waveguide conversion parts 45 and 46 to the antenna elements 431 and 441. Specifically, in the first transmission line part 430, the predetermined section is a straight line part from the first waveguide conversion part 45 to the first antenna elements 431. In the second transmission line part 440, the predetermined section is a straight line part from the second waveguide conversion part 46 to the second antenna elements 441. Specifically, the length L7 of the predetermined section of the first transmission line part 430 is the distance from the center of the upper end of the first waveguide conversion part 45 to the lowest first antenna element 431. The length L8 of the predetermined section of the second transmission line part 440 is the distance from the center of the upper end of the second waveguide conversion part 46 to the lowest second antenna element 441. Also, in the present embodiment, the length L8 is longer than the length L7; however, the length L7 may be longer than the length L8.

In the case where electric waves are propagated in the waveguides, unnecessary electric waves are likely to be radiated. Such unnecessary radiation causes distortion in beam patterns of the transmitting antenna 43 and the receiving antenna 44. Further, like the present embodiment, if the distances in the up and down direction between the antenna elements 431 and 441 and the waveguide conversion parts 45 and 46 where unnecessary electric waves can be radiated are set to be large, large distortion is likely to occur in beam patterns in the vertical direction.

In the present embodiment, the waveguide conversion parts 45 and 46 are provided intentionally away from the antenna elements 431 and 441 in the up and down direction such that unnecessary radiation is likely to occur in the vertical direction. Further, similarly to the second embodiment, the transmitting antenna 43 and the receiving antenna 44 are arranged such that the magnitude of the difference between the lengths L7 and L8 from the unnecessary-electric-wave occurrence parts to the antenna elements becomes an odd multiple of a half wavelength of the guide wavelength $\lambda g$. Therefore, the positions of peaks and troughs in distortion which occurs in a transmission beam pattern in the vertical direction are opposite to those in distortion which occurs in a reception beam pattern in the vertical direction. As a result, distortion which occurs in the transmission beam pattern is weakened by distortion which occurs in the reception beam pattern. As a result, a transmission/reception synthetic beam pattern in the vertical direction becomes a fine pattern with reduced distortion.

6. Fifth Embodiment

Similarly to the second embodiment, a fifth embodiment is a configuration suppressing the influence of unnecessary radiation attributable to waveguide conversion parts. However, a planar antenna device of the fifth embodiment is a configuration reducing distortion of amplitude difference in the horizontal direction in an amplitude monopulse system, not a configuration reducing distortion of transmission/reception synthetic beam patterns in the horizontal direction. The components and effects identical to those of the second embodiment will not be described as long as a description thereof is not especially required.

Also, the amplitude monopulse system is one of monopulse systems in which angle measurement information is obtained by processing one pulse (monopulse) at one beam position. In the amplitude monopulse system, two beams partially overlapping each other are used as a pair to detect the angle of an object. Angle detection is performed by calculating the difference between the amplitudes of reception signals of two beams. In general, a difference signal is normalized by a sum signal.

Figure 9:
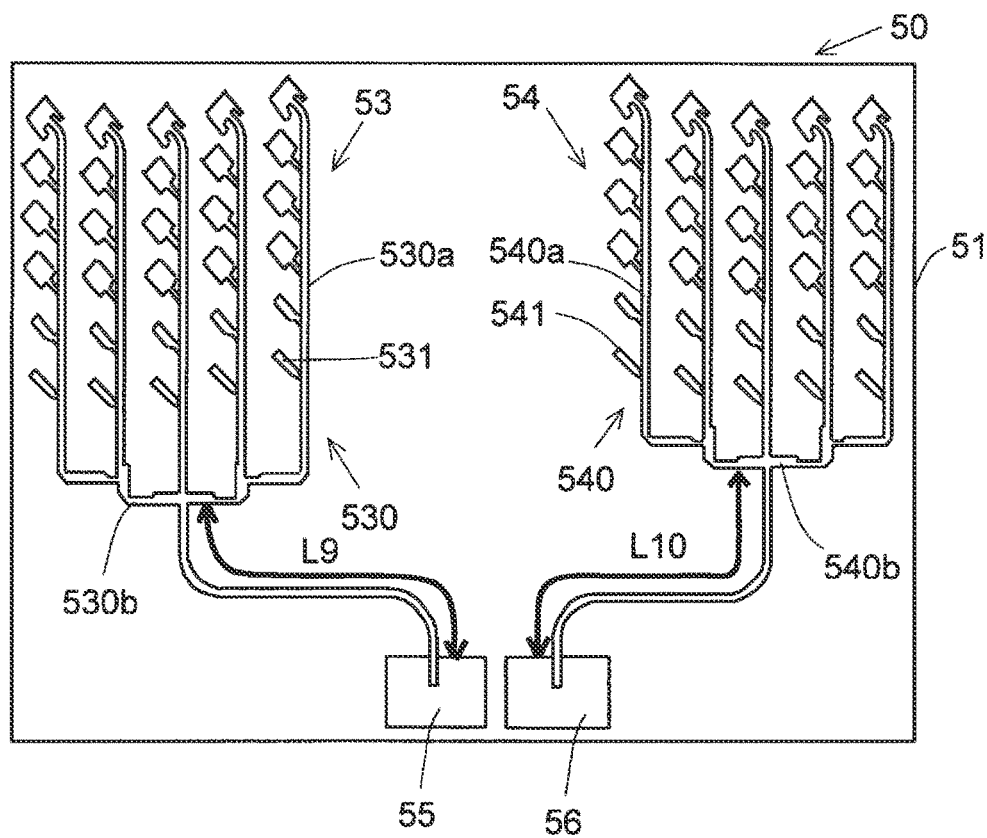
FIG. 9 is a plan view schematically illustrating the configuration of a part of a planar antenna device according to a fifth embodiment.

FIG. 9 is a plan view schematically illustrating the configuration of a part of a planar antenna device 50 according to the fifth embodiment. As shown in FIG. 9, the planar antenna device 50 includes a first antenna 53, a second antenna 54, a first waveguide conversion part 55, and a second waveguide conversion part 56, which are provided on the front surface of a substrate 51.

Both of the first antenna 53 and the second antenna 54 are transmitting antennae for amplitude monopulse radars. The first antenna 53 and the second antenna 54 are antennae for obtaining information on the angles of objects in the horizontal direction.

Also, on the front surface of the substrate 51, besides the transmitting antennae 53 and 54, receiving antennas are arranged; however, the receiving antennae are not shown in FIG. 9. It is preferable that the receiving antennae which are arranged on the front surface of the substrate 51 have a configuration suppressing occurrence of unnecessary radiation as much as possible. For example, it is preferable that transmission line parts of the receiving antennae do not have a curved shape. Also, it is preferable that the receiving antennae be arranged such that the distances from antenna elements to the waveguide conversion parts in the up and down direction and the left-right direction become short in acceptable ranges.

The first antenna 53 has a transmission line part 530 and antenna elements 531, and the second antenna 54 has a transmission line part 540 and antenna elements 541. Ends of the transmission line parts 530 and 540 positioned on one side are electrically connected to connection parts provided on the front surface of the substrate 51. In the present embodiment, the connection parts are the waveguide conversion parts 55 and 56. In other words, specifically, the corresponding end of the first transmission line part 530 is electrically connected to the first waveguide conversion part 55. Also, the corresponding part of the second transmission line part 540 is electrically connected to the second waveguide conversion part 56. The antenna elements 531 and 541 are connected to sides of straight line parts 530*a* and 540*a* which are parts of the transmission line parts 530 and 540 and extend in the up and down direction.

In the present embodiment, the first antenna 53 has a plurality of straight line parts 530*a* aligned in the left-right direction, and a connection part 530*b* connecting the plurality of straight line parts 530*a*, and the second antenna 54 has a plurality of straight line parts 540*a* aligned in the left-right direction, and a connection part 540*b* connecting the plurality of straight line parts 540*a*. Specifically, the first antenna 53 has five first straight line parts 530*a*. To a side of each of the five first straight line parts 530*a*, a plurality of first antenna elements 531 is connected in the up and down direction. Ends of the five first straight line parts 530*a* close to the first waveguide conversion part 55 are connected by the first connection part 530*b* extending in the left-right direction. Also, the second antenna 54 has five second straight line parts 540*a*. To a side of each of the five second straight line parts 540*a*, a plurality of second antenna elements 541 is connected in the up and down direction. Ends of the five second straight line parts 540*a* close to the second waveguide conversion part 56 are connected by the second connection part 540*b* extending in the left-right direction. In other words, each of the first antenna 53 and the second antenna 54 is configured as a two-dimensional array antenna.

Also, the first antenna 53 and the second antenna 54 separately emit beams to the left and the right in the horizontal direction. Power having different phases is supplied to the straight line parts 530*a* and 540*a*, respectively, whereby the first antenna 53 and the second antenna 54 incline the directions of beams to predetermined directions. One of the first antenna 53 and the second antenna 54 emits beams to the right, and the other emits beams to the left. The magnitudes of the inclination angles of such beams are the same. The numbers of straight line parts 530*a* and 540*a* need only to be two or more, and may be any other number other than five.

The waveguide conversion parts 55 and 56 are positioned away from the antenna elements 531 and 541 in the left-right direction. Specifically, the first waveguide conversion part 55 is positioned away to the right from the first antenna elements 531. The second waveguide conversion part 56 is positioned away to the left from the second antenna elements 541. The configuration in which the waveguide conversion parts 55 and 56 are away from the antenna elements 531 and 541 in the left-right direction is realized since the transmission line parts 530 and 540 have S-shaped parts.

In the present embodiment, the first antenna 53 and the second antenna 54 are provided such that the magnitude of the difference between the lengths of predetermined sections of the transmission line parts 530 and 540 becomes a positive odd multiple of a half wavelength of the guide wavelength λg of electric waves which can be transmitted in the transmission line parts 530 and 540. The predetermined sections are provided in sections from connection parts 55 and 56 to the antenna elements 531 and 541.

In the present embodiment, the predetermined sections are from the waveguide conversion parts 55 and 56 to the connection part 530*b* and 540*b*. Specifically, in the first transmission line part 530, the predetermined section is from the first waveguide conversion part 55 to the first connection part 530*b*. In the second transmission line part 540, the predetermined section is from the second waveguide conversion part 56 to the second connection part 540*b*. Specifically, the length L9 of the predetermined section of the first transmission line part 530 is the distance from the center of the upper end of the first waveguide conversion part 55 to the center part of the first connection part 530*b*. The length L10 of the predetermined section of the second transmission line part 540 is the distance from the center of the upper end of the second waveguide conversion part 56 to the center part of the second connection part 540*b*. Also, the difference between the length L9 of the predetermined section and the length L10 of the predetermined section may be made between S-shaped parts of the predetermined sections. For example, the difference may be made between the lengths of straight line parts connected to the connection parts 530*b* and 540*b* or between the lengths of straight line parts extending in the left-right direction. Also, in the present embodiment, the length L9 is longer than the length L10; however, the length L10 may be longer than the length L9.

In the case where electric waves are propagated in the waveguides, unnecessary electric waves are likely to be radiated. Such unnecessary radiation causes distortion in beams to be radiated from the two transmitting antenna 53 and 54. Further, like the present embodiment, if the distances in the left-right direction between the antenna elements 531 and 541 and the waveguide conversion parts 55 and 56 where unnecessary electric waves can be radiated are set to be large, large distortion is likely to occur in the horizontal direction.

Figure 10:
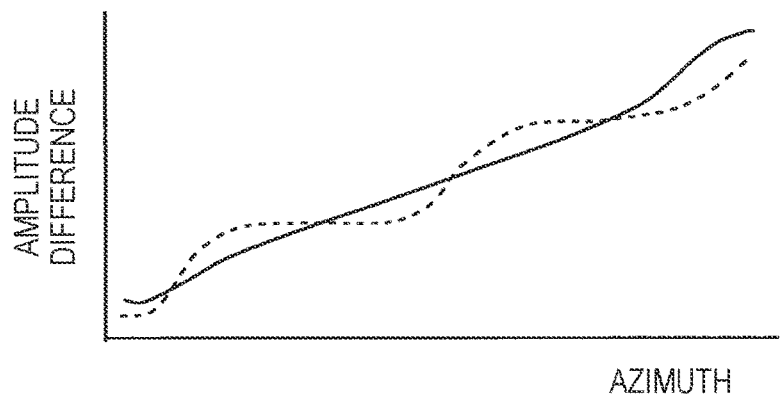
FIG. 10 is a schematic diagram for explaining an effect of the fifth embodiment.

FIG. 10 is a schematic diagram for explaining the effect of the fifth embodiment. FIG. 10 shows the relation between angle in the horizontal direction and amplitude difference in the amplitude monopulse system. If unnecessary radiation occurs, as shown by a broken line in FIG. 10, the amplitude difference becomes a wave pattern. In other words, distortion occurs in the amplitude difference in the horizontal direction. If the amplitude difference waves, a plurality of azimuths may be detected at the same amplitude difference, and the azimuths of objects may not be correctly detected.

On this account, in the present embodiment, the waveguide conversion parts 55 and 56 are provided intentionally away from the antenna elements 531 and 541 in the left-right direction such that unnecessary radiation is likely to occur in the horizontal direction. Further, the two transmitting antennae 53 and 54 are arranged such that the magnitude of the difference between the lengths L9 and L10 from unnecessary-electric-wave occurrence parts to the connection parts (antenna parts) becomes an odd multiple of a half wavelength of the guide wavelength λg, whereby the phases of unnecessary electric waves to be radiated are shifted by a half of a cycle. Therefore, unnecessary electric waves to be radiated from the two transmitting antennae 53 and 54 are weakened by each other. As a result, as shown by a solid line in FIG. 10, it is possible to reduce distortion of the amplitude difference in the horizontal direction.

Also, in the present embodiment, both of the first antenna and the second area are transmitting antennae for amplitude monopulse radars; however, they are not limited thereto. Both of the first antenna and the second antenna may be receiving antennae for amplitude monopulse radars. Even in this case, the first antenna and the second antenna have different directionalities to the left and the right. Also, it is preferable that transmitting antennae which are arranged together with receiving antennae on the same surface of the substrate suppress unnecessary radiation as much as possible.

7. Sixth Embodiment

Similarly to the fifth embodiment, a sixth embodiment is a configuration suppressing the influence of unnecessary radiation attributable to waveguide conversion parts in order to reduce distortion of amplitude difference in an amplitude monopulse system. However, the sixth embodiment is a configuration suppressing distortion of amplitude difference in the vertical direction, not in the horizontal direction. The components and effects identical to those of the fifth embodiment will not be described as long as a description thereof is not especially required.

Figure 11:
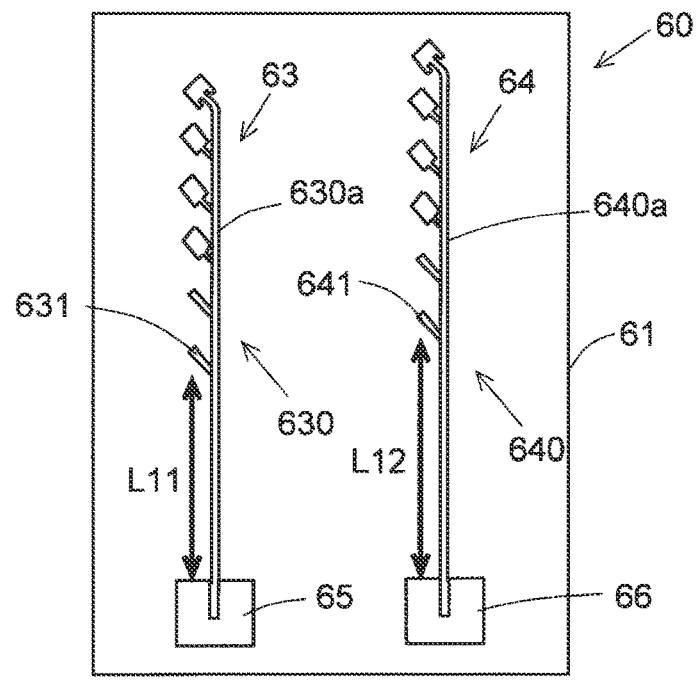
FIG. 11 is a plan view schematically illustrating the configuration of a part of a planar antenna device according to a sixth embodiment.

FIG. 11 is a plan view schematically illustrating the configuration of a part of a planar antenna device 60 according to the sixth embodiment. As shown in FIG. 11, the planar antenna device 60 includes a first antenna 63, a second antenna 64, a first waveguide conversion part 65, and a second waveguide conversion part 66, which are provided on the front surface of a substrate 61.

Both of the first antenna 63 and the second antenna 64 are transmitting antennae for amplitude monopulse radars. The first antenna 63 and the second antenna 64 are antennae for obtaining information on the angles of objects in the vertical direction.

Similarly to the fifth embodiment, on the front surface of the substrate 61, besides the transmitting antennae 63 and 64, receiving antennas are arranged. The first antenna 63 has a transmission line part 630 and antenna elements 631, and the second antenna 64 has a transmission line part 640 and antenna elements 641. Ends of the transmission line parts 630 and 640 positioned on one side are electrically connected to connection parts provided on the front surface of the substrate 61. In the present embodiment, the connection parts are the waveguide conversion parts 65 and 66. The corresponding end of the first transmission line part 630 is electrically connected to the first waveguide conversion part 65. Also, the corresponding end of the second transmission line part 640 is electrically connected to the second waveguide conversion part 66. The antenna elements 631 and 641 are connected to sides of straight line parts 630a and 640a which are parts of the transmission line parts 630 and 640 and extend in the up and down direction.

Also, the first antenna 63 and the second antenna 64 separately emit beams upward and downward in the vertical direction. For example, in the first antenna 63, in the case where the lowest antenna element 631 is referred to as a reference antenna element and the phase of power which is supplied to the reference antenna element is referred to as a reference phase, the phase of power to be supplied to an antenna element 631 farther upward from the reference antenna element is shifted more from the reference phase. Also, even in the second antenna 64, in the case where the lowest antenna element 641 is referred to as a reference antenna element and the phase of power which is supplied to the reference antenna element is referred to as a reference phase, the phase of power to be supplied to an antenna element 641 farther upward from the reference antenna element is shifted more from the reference phase. The first antenna 63 and the second antenna 64 shift the phase with respect to the reference phase in directions opposite to each other. Therefore, one of the first antenna 63 and the second antenna 64 emits beams to the upper side, and the other emits beams to the lower side. The magnitudes of the inclination angles on the upper side and the lower side are the same.

The waveguide conversion parts 65 and 66 are positioned away from the antenna elements 631 and 641 in the up and down direction. Specifically, the first waveguide conversion part 65 is positioned away downward from the first antenna elements 631. The second waveguide conversion part 66 is positioned away downward from the second antenna elements 641. The configuration in which the waveguide conversion parts 65 and 66 are away from the antenna elements 631 and 641 in the up and down direction is realized since the transmission line parts 630 and 640 have the straight line parts extending in the up and down direction.

In the present embodiment, the first antenna 63 and the second antenna 64 are provided such that the magnitude of the difference between the lengths of predetermined sections of the transmission line parts 630 and 640 becomes a positive odd multiple of a half wavelength of the guide wavelength $\lambda g$ of electric waves which can be transmitted in the transmission line parts 630 and 640.

In the present embodiment, the predetermined sections are from the waveguide conversion parts 65 and 66 to the antenna elements 631 and 641. Specifically, in the first transmission line part 630, the predetermined section is a straight line section from the first waveguide conversion part 65 to the first antenna elements 631. In the second transmission line part 640, the predetermined section is a straight line section from the second waveguide conversion part 66 to the second antenna elements 641. Specifically, the length L11 of the predetermined section of the first transmission line part 630 is the distance from the center of the upper end of the first waveguide conversion part 65 to the lowest first antenna element 631. The length L12 of the predetermined section of the second transmission line part 640 is the distance from the center of the upper end of the second waveguide conversion part 66 to the lowest second antenna element 641. Also, in the present embodiment, the length L12 is longer than the length L11; however, the length L11 may be longer than the length L12.

In the case where electric waves are propagated in the waveguides, unnecessary electric waves are likely to be radiated. Such unnecessary radiation causes distortion in beams to be radiated from the two transmitting antenna 63 and 64. Further, like the present embodiment, if the distances in the vertical direction between the antenna elements 631 and 641 and the waveguide conversion parts 65 and 66 where unnecessary electric waves can be radiated are set to be large, large distortion is likely to occur in the up and down direction.

In the present embodiment, the waveguide conversion parts 65 and 66 are provided intentionally away from the antenna elements 631 and 641 in the up and down direction such that unnecessary radiation is likely to occur in the up and down direction. Further, the two transmitting antennae 63 and 64 are arranged such that the magnitude of the difference between the lengths L11 and L12 from the unnecessary-electric-wave occurrence parts to the antenna elements becomes an odd multiple of a half wavelength of the guide wavelength $\lambda g$, whereby the phases of unnecessary electric waves to be radiated are shifted by a half of a cycle. Therefore, unnecessary electric waves to be radiated from the two transmitting antennae 63 and 64 are weakened by each other. As a result, it is possible to reduce distortion of the amplitude difference in the vertical direction.

Also, in the present embodiment, both of the first antenna and the second area are transmitting antennae for amplitude monopulse radars; however, they are not limited thereto. Both of the first antenna and the second antenna may be receiving antennae for amplitude monopulse radars. This point is the same as the fifth embodiment.

8. Seventh Embodiment

Similarly to the second embodiment, a seventh embodiment is a configuration suppressing the influence of unnecessary radiation attributable to waveguide conversion parts. However, a planar antenna device of the seventh embodiment is a configuration reducing distortion of phase difference in the horizontal direction in a phase monopulse system, not a configuration reducing distortion of transmission/reception synthetic beam patterns in the horizontal direction. The components and effects identical to those of the second embodiment will not be described as long as a description thereof is not especially required.

Also, the phase monopulse system is one of monopulse systems in which angle measurement information is obtained by processing one pulse (monopulse) at one beam position. The phase monopulse system has a receiving antenna which is a reference channel, and receiving antennae which are different channels to be compared with the reference channel, and detects the angles of objects by calculating phase difference between the reference channel and the different channel. Although the number of receiving antennae which are different channels may be one, it is preferable that the number of receiving antennae which are different channels be two or more in order to improve the accuracy of angle direction.

Figure 12:
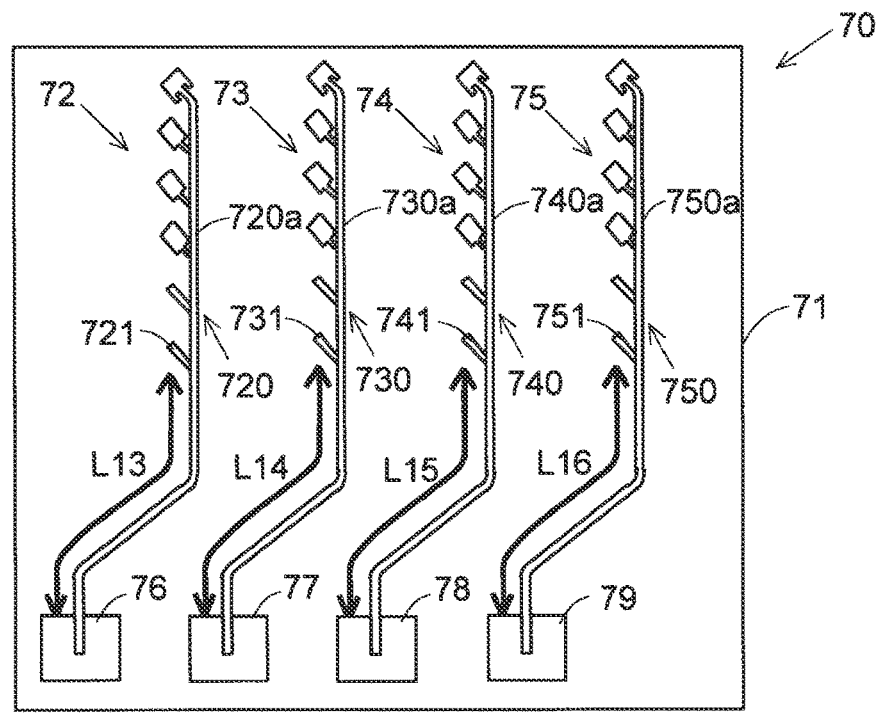
FIG. 12 is a plan view schematically illustrating the configuration of a part of a planar antenna device according to a seventh embodiment.

FIG. 12 is a plan view schematically illustrating the configuration of a part of a planar antenna device 70 according to the seventh embodiment. As shown in FIG. 12, the planar antenna device 70 includes a first antenna 72, a second antenna 73, a third antenna 74, a fourth antenna 75, a first waveguide conversion part 76, a second waveguide conversion part 77, a third waveguide conversion part 78, and a fourth waveguide conversion part 79, which are provided on the front surface of a substrate 71.

Both of the first antenna 72 and the second antenna 73 are receiving antennae for phase monopulse radars. Also, the third antenna 74 and the fourth antenna 75 are receiving antennae for phase monopulse radars. The first antenna 72 is an antenna for a reference channel as described above. The other antennae 73 to 75 are antennae for different channels as described above. In the present embodiment, the four antennae 72 to 75 are aligned at regular intervals in the left-right direction.

On the front surface of the substrate 71, besides the receiving antennae 72 to 75, transmitting antennae are arranged; however, they are not shown in FIG. 12. It is preferable that the transmitting antennae which are arranged on the front surface of the substrate 71 have a configuration suppressing occurrence of unnecessary radiation as much as possible. For example, it is preferable that transmission line parts of the transmitting antennae do not have a curved shape. Also, it is preferable that the transmitting antennae be arranged such that the distances from antenna elements to the waveguide conversion parts in the up and down direction and the left-right direction become short in acceptable ranges.

Each of the receiving antennae 72 to 75 has a corresponding one of transmission line parts 720, 730, 740, and 750 and corresponding ones of antenna elements 721, 731, 741, and 751. One end of the first transmission line part 720 is electrically connected to the first waveguide conversion part 76. One end of the second transmission line part 730 is electrically connected to the second waveguide conversion part 77. One end of the third transmission line part 740 is electrically connected to the third waveguide conversion part 78. One end of the fourth transmission line part 750 is electrically connected to the fourth waveguide conversion part 79. Also, the waveguide conversion parts 76 to 79 are examples of connection parts of the present invention. The antenna elements 721, 731, 741, and 751 are connected to sides of straight line parts 720a, 730a, 740a, and 750a which are parts of the transmission line parts 720, 730, 740, and 750 and extend in the up and down direction.

The waveguide conversion parts 76 to 79 are positioned away from the antenna elements 721, 731, 741, and 751 in the left-right direction. Specifically, the first waveguide conversion part 76 is positioned away to the left from the first antenna elements 721. The second waveguide conversion part 77 is positioned away to the left from the second antenna elements 731. The third waveguide conversion part 78 is positioned away to the left from the third antenna elements 741. The fourth waveguide conversion part 79 is positioned away to the left from the fourth antenna elements 751. The configuration in which the waveguide conversion parts 76 to 79 are away from the antenna elements 721, 731, 741, and 751 in the left-right direction is realized since the transmission line parts 720, 730, 740, and 750 have S-shaped parts.

In the present embodiment, the first antenna 72 and the second antenna 73 are arranged such that the magnitude of the difference between the lengths of predetermined sections of the transmission line parts 720 and 730 becomes a positive even multiple of a half wavelength of the guide wavelength $\lambda g$ of electric waves which can be transmitted in the transmission line parts 720 and 730. In other words, the magnitude $\Delta$ of the difference between the lengths of the predetermined sections satisfies the following expression (2).

$$\Delta = \frac{1}{2} \times \lambda g \times 2m \quad (2)$$

Here, $\lambda g$ is the guide wavelength when electric waves of a use frequency are transmitted in the transmission line parts, and m is a natural number of 1 or greater.

Further, in other words, the magnitude of the difference between the lengths of the predetermined sections is a natural number multiple of the guide wavelength $\lambda g$. Also, in the present embodiment, the third antenna 74 and the fourth antenna 75 are arranged similarly to the second antenna 73. However, this is an example, and each of the pair of the first antenna 72 and the third antenna 74 and the pair of the first antenna 72 and the fourth antenna 75 may be arranged such that the magnitude of the difference between the lengths of predetermined sections satisfies the expression (2). Also, in some cases, each of the pair of the first antenna 72 and the third antenna 74 and the pair of the first antenna 72 and the fourth antenna 75 may be arranged such that the difference between the lengths of the predetermined sections becomes zero.

In the present embodiment, the predetermined sections are from the waveguide conversion parts 76 to 79 to the antenna elements 721, 731, 741, and 751. Specifically, in the first transmission line part 720, the predetermined section is from the first waveguide conversion part 76 to the first antenna elements 721. In the second transmission line part 730, the predetermined section is from the second waveguide conversion part 77 to the second antenna elements 731. In the third transmission line part 740, the predetermined section is from the third waveguide conversion part 78 to the third antenna elements 741. In the fourth transmission line part 750, the predetermined section is from the fourth waveguide conversion part 79 to the fourth antenna elements 751.

Specifically, the length L13 of the predetermined section of the first transmission line part 720 is the distance from the center of the upper end of the first waveguide conversion part 76 to the lowest first antenna element 721. The length L14 of the predetermined section of the second transmission line part 730 is the distance from the center of the upper end of the second waveguide conversion part 77 to the lowest second antenna element 731. The length L15 of the predetermined section of the third transmission line part 740 is the distance from the center of the upper end of the second waveguide conversion part 78 to the lowest third antenna element 741. The length L16 of the predetermined section of the fourth transmission line part 750 is the distance from the center of the upper end of the fourth waveguide conversion part 77 to the lowest fourth antenna element 751. Also, the differences between the length L13 of the predetermined section and the lengths 14 to 16 may be made between S-shaped parts of the predetermined sections. For example, the differences may be made between the lengths of straight line parts having the antenna elements 721, 731, 741, and 751 connected thereto. Also, in the present embodiment, the lengths L14 to L16 are longer than the length L13; however, they may be shorter than the length L13.

In the case where electric waves are propagated in the waveguides, unnecessary electric waves are likely to be radiated. Such unnecessary radiation causes distortion in beams in the receiving antennae 72 to 75. Further, like the present embodiment, if the distances in the left-right direction between the antenna elements 721, 731, 741, and 751 and the waveguide conversion parts 76 to 79 where unnecessary electric waves can be radiated are set to be large, large distortion is likely to occur in the horizontal direction.

Figure 13:
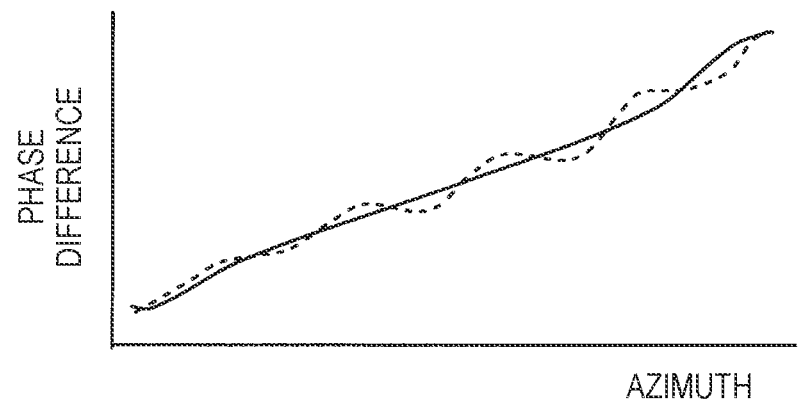
FIG. 13 is a schematic diagram for explaining an effect of the seventh embodiment.

FIG. 13 is a schematic diagram for explaining the effect of the seventh embodiment. FIG. 13 shows the relation between angle and phase difference in the horizontal direction in the phase monopulse system. The phase monopulse system obtains the phase differences between signals of the first antenna 72 which is the reference channel and signals of the antennae 73 to 75 which are different channels, and calculates the azimuths of objects. Therefore, even if distortion occurs in beams due to unnecessary radiation, if the reference channel and the different channels are the same in the phase of unnecessary radiation, the influence of unnecessary radiation is canceled when the phase difference is calculated, so it is possible to accurately calculate the phase difference.

In the present embodiment, the antenna elements 721, 731, 741, and 751 are provided intentionally away from the antenna elements 721, 731, 741, and 751 in the left-right direction, so unnecessary radiation is likely to occur in the horizontal direction. Further, the first antenna 72 for the reference channel and the antennae 73 to 75 for the different channels are arranged such that the magnitudes of the differences between the lengths L13 to L16 from the unnecessary-electric-wave occurrence parts to the antenna elements become natural number multiples of the guide wavelength λg, and thus they become the same in the phase of unnecessary electric waves to be radiated in the horizontal direction. Therefore, it is possible to cancel the influence of unnecessary radiation when phase difference in the horizontal direction is calculated, and as shown in FIG. 13, it is possible to suppress distortion of phase difference in the horizontal direction. Also, a broken line of FIG. 13 shows a state where phase distortion in the horizontal direction has occurred due to unnecessary radiation.

9. Eighth Embodiment

Similarly to the seventh embodiment, an eighth embodiment is a configuration suppressing the influence of unnecessary radiation attributable to waveguide conversion parts in order to reduce distortion of phase difference in a phase monopulse system. However, the eighth embodiment is a configuration reducing distortion of phase difference in the vertical direction, not in the horizontal direction. The components and effects identical to those of the seventh embodiment will not be described as long as a description thereof is not especially required.

Figure 14:
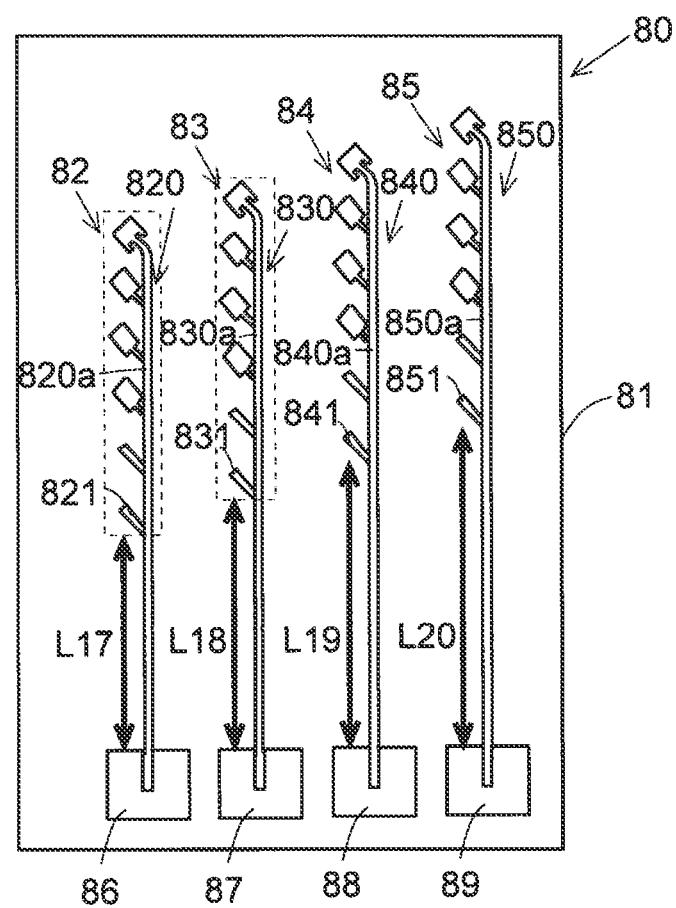
FIG. 14 is a plan view schematically illustrating the configuration of a part of a planar antenna device according to an eighth embodiment.

FIG. 14 is a plan view schematically illustrating the configuration of a part of a planar antenna device 80 according to the eighth embodiment. As shown in FIG. 14, the planar antenna device 80 includes a first antenna 82, a second antenna 83, a third antenna 84, a fourth antenna 85, a first waveguide conversion part 86, a second waveguide conversion part 87, a third waveguide conversion part 88, and a fourth waveguide conversion part 89, which are provided on the front surface of a substrate 81.

Both of the first antenna 82 and the second antenna 83 are receiving antennae for phase monopulse radars. Also, the third antenna 84 and the fourth antenna 85 are receiving antennae for phase monopulse radars. The first antenna 82 is an antenna for a reference channel as described above. The other antennae 83 to 85 are antennae for different channels as described above.

On the front surface of the substrate 81, besides the receiving antennae 82 to 85, transmitting antennae are arranged; however, they are not shown in FIG. 14. This point is the same as the seventh embodiment.

Each of the receiving antennae 82 to 85 has a corresponding one of transmission line parts 820, 830, 840, and 850 and corresponding ones of antenna elements 821, 831, 841, and 851. One end of the first transmission line part 820 is electrically connected to the first waveguide conversion part 86. One end of the second transmission line part 830 is electrically connected to the second waveguide conversion part 87. One end of the third transmission line part 840 is electrically connected to the third waveguide conversion part 88. One end of the fourth transmission line part 850 is electrically connected to the fourth waveguide conversion part 89. Also, the waveguide conversion parts 86 to 89 are examples of connection parts of the present invention. The antenna elements 821, 831, 841, and 851 are connected to sides of straight line parts 820a, 830a, 840a, and 850a which are parts of the transmission line parts 820, 830, 840, and 850 and extend in the up and down direction.

The four antennae 82 to 85 are disposed at regular intervals in the left-right direction. Also, the four antennae 82 to 85 are deviated from one another in the up and down direction. Specifically, a range where the second antenna elements 831 of the second antenna 83 are arranged (a range surrounded by a broken line) is deviated upward from a range where the first antenna elements 821 of the first antenna 82 are arranged (a range surrounded by a broken line). A range where the third antenna elements 841 of the third antenna 84 are arranged is deviated upward from the range where the second antenna elements 831 of the second antenna 83 are arranged. A range where the fourth antenna elements 851 of the fourth antenna 85 are arranged is deviated upward from the third antenna elements 841 of the third antenna 84 are arranged.

The waveguide conversion parts 86 to 89 are positioned away from the antenna elements 821, 831, 841, and 851 in the up and down direction. Specifically, the first waveguide conversion part 86 is positioned away downward from the first antenna elements 821. The second waveguide conversion part 87 is positioned away downward from the second antenna elements 831. The third waveguide conversion part 88 is positioned away downward from the third antenna elements 841. The fourth waveguide conversion part 89 is positioned away downward from the fourth antenna elements 851. The configuration in which the waveguide conversion parts 86 to 89 are away from the antenna elements 821, 831, 841, and 851 in the up and down direction is realized since the transmission line parts 820, 830, 840, and 850 have the straight line parts positioned below the antenna elements 821, 831, 841, and 851.

In the present embodiment, the first antenna 82 and the second antenna 83 are arranged such that the magnitude of the difference between the lengths of predetermined sections of the transmission line parts 820 and 830 becomes a positive even multiple of a half wavelength of the guide wavelength $\lambda g$ of electric waves which can be transmitted in the transmission line parts 820 and 830. In other words, the magnitude of the difference between the lengths of the predetermined sections is a natural number multiple of the guide wavelength kg. Similarly, each of the pair of the first antenna 82 and the third antenna 84 and the pair of the first antenna 82 and the fourth antenna 85 are arranged such that the magnitude of the difference between the predetermined sections becomes a natural number multiple of the guide wavelength $\lambda g$.

In the present embodiment, the predetermined sections are from the waveguide conversion parts 86 to 89 to the antenna elements 821, 831, 841, and 851. Specifically, in the first transmission line part 820, the predetermined section is a straight line section from the first waveguide conversion part 86 to the first antenna elements 821. In the second transmission line part 830, the predetermined section is a straight line section from the second waveguide conversion part 87 to the second antenna elements 831. In the third transmission line part 840, the predetermined section is a straight line section from the third waveguide conversion part 88 to the third antenna elements 841. In the fourth transmission line part 850, the predetermined section is a straight line section from the fourth waveguide conversion part 89 to the fourth antenna elements 851.

Specifically, the length L17 of the predetermined section of the first transmission line part 820 is the distance from the center of the upper end of the first waveguide conversion part 86 to the lowest first antenna element 821. The length L18 of the predetermined section of the second transmission line part 830 is the distance from the center of the upper end of the second waveguide conversion part 87 to the lowest second antenna element 831. The length L19 of the predetermined section of the third transmission line part 840 is the distance from the center of the upper end of the second waveguide conversion part 88 to the lowest third antenna element 841. The length L20 of the predetermined section of the fourth transmission line part 850 is the distance from the center of the upper end of the fourth waveguide conversion part 87 to the lowest fourth antenna element 851. Also, in the present embodiment, the length L17 of the antenna which is the reference channel is shorter than the lengths L18 to L20 of the antennae which are the different channels; however, the length of the reference channel may be longer than the lengths of the different channels.

In the case where electric waves are propagated in the waveguides, unnecessary electric waves are likely to be radiated. Such unnecessary radiation causes distortion on beams in the receiving antennae 82 to 85. Further, like the present embodiment, if the distances in the up and down direction between the antenna elements 821, 831, 841, and 851 and the waveguide conversion parts 86 to 89 where unnecessary electric waves can be radiated are set to be large, large distortion is likely to occur in the up and down direction.

In the present embodiment, the antenna elements 821, 831, 841, and 851 are provided intentionally away from the antenna elements 821, 831, 841, and 851 in the up and down direction, so unnecessary radiation is likely to occur in the up and down direction. Further, the first antenna 82 for the reference channel and the antennae 83 to 85 for the different channels are arranged such that the magnitudes of the differences between the lengths L17 to L20 from the unnecessary-electric-wave occurrence parts to the antenna elements become natural number multiples of the guide wavelength $\lambda g$, and thus they become the same in the phase of unnecessary electric waves to be radiated. Therefore, it is possible to cancel the influence of unnecessary radiation when phase difference is calculated, and it is possible to suppress distortion of phase difference in the vertical direction.

Various technical features disclosed in this specification can be modified variously without departing from the spirit of the technical invention besides the embodiments described above. Also, the plurality of embodiments and modifications disclosed in this specification may be appropriately combined within an acceptable range.

For example, the numbers of antennae shown in the individual embodiments are merely illustrative, and the numbers of antennae may be appropriately changed.

Also, as described above, except for the fifth embodiment, each antenna is configured as a one-dimensional array antenna; however, this is merely illustrative. For example, even in the configurations other than the fifth embodiment, each antenna may be a two-dimensional array antenna having a plurality of one-dimensional array antennae arranged in the left-right direction. In this case, for example, the predetermined sections become from the curved parts to the connection parts, not from the curved parts to the antenna elements. Also, for example, the predetermined sections become from the waveguide conversion parts to the connection parts, not from the waveguide conversion parts to the antenna elements. Each connection part is a part of a transmission line part connecting a plurality of straight line parts constituting the transmission line part and arranged in the left-right direction. Each straight line part is a part extending in the up and down direction and having a side to which antenna elements are connected. Even in such a configuration, it is possible to appropriately reduce distortion attributable to unnecessary radiation.

Also, in the fifth to eighth embodiments described with regard to the amplitude monopulse system and the phase monopulse system, only the configurations in the cases where unnecessary radiation occurs from the waveguide conversion parts have been described. These are merely illustrative. It goes without saying that the technical ideas shown in the individual embodiments can also be applied to the configurations of the first embodiment and the third embodiment in which unnecessary radiation is caused by the curved shapes.

What is claimed is:

1. A planar antenna device having a first antenna and a second antenna arranged on a front surface of a substrate to be set in parallel to an up and down direction, wherein:
   each of the first antenna and the second antenna comprises:
      a transmission line part configured to have one end electrically connected to a connection part provided on the front surface of the substrate and able to transmit electric waves; and
      antenna elements connected to a side of a straight line part which is a part of the transmission line part and extends in the up and down direction,
   the first antenna and the second antenna are arranged such that the magnitude of the difference between the lengths of predetermined sections of the transmission line parts becomes one of a positive odd multiple of a half wavelength of the guide wavelength of electric waves which can be transmitted in the transmission line parts and a positive even multiple of a half wavelength of the guide wavelength, and
   the predetermined sections are provided in sections from the connection parts to the antenna elements.

2. The planar antenna device according to claim 1, wherein:
   the first antenna is a transmitting antenna for transmitting electric waves,
   the second antenna is a receiving antenna for receiving electric waves, and
   the magnitude of the difference between the lengths of the predetermined sections is a positive odd multiple of the half wavelength of the guide wavelength.

3. The planar antenna device according to claim 1, wherein:
   both of the first antenna and the second antenna are transmitting antennae or receiving antennae for an amplitude monopulse radar, and
   the magnitude of the difference between the lengths of the predetermined sections is a positive odd multiple of the half wavelength of the guide wavelength.

4. The planar antenna device according to claim 1, wherein:
   both of the first antenna and the second antenna are receiving antennae for a phase monopulse radar, and
   the magnitude of the difference between the lengths of the predetermined sections is a positive even multiple of the half wavelength of the guide wavelength.

5. The planar antenna device according to claim 1, wherein:
   the transmission line parts have curved parts positioned away from the antenna elements in a left-right direction, and
   the predetermined sections are provided in sections from the curved parts to the antenna elements.

6. The planar antenna device according to claim 1, wherein:
   the transmission line parts have curved parts positioned away from the antenna elements in the up and down direction, and
   the predetermined sections are provided in sections from the curved parts to the antenna elements.

7. The planar antenna device according to claim 1, wherein:
   each of the first antenna and the second antenna comprises:
      a plurality of straight line parts arranged in a left-right direction; and
      a connection part connecting the plurality of straight line parts,
   the transmission line parts have curved parts positioned away from the antenna elements in the left-right direction, and
   the predetermined sections are provided in sections from the curved parts to the connection parts.

8. The planar antenna device according to claim 1, wherein:
   each of the first antenna and the second antenna comprises:
      a plurality of straight line parts arranged in a left-right direction; and
      a connection part connecting the plurality of straight line parts,
   the transmission line parts have curved parts positioned away from the antenna elements in the up and down direction, and
   the predetermined sections are provided in sections from the curved parts to the connection parts.

9. The planar antenna device according to claim 1, wherein:
   the connection parts are waveguide conversion parts,
   the waveguide conversion parts are positioned away from the antenna elements in a left-right direction, and
   the predetermined sections are provided in sections from the waveguide conversion parts to the antenna elements.

10. The planar antenna device according to claim 1, wherein:
    the connection pads are waveguide conversion parts,
    the waveguide conversion parts are positioned away from the antenna elements in the up and down direction, and
    the predetermined sections are provided in sections from the waveguide conversion parts to the antenna elements.

11. The planar antenna device according to claim 1, wherein:
    each of the first antenna and the second antenna comprises:
       a plurality of straight line parts arranged in a left-right direction; and
       a connection part connecting the plurality of straight line parts,
    the connection parts are waveguide conversion parts,
    the waveguide conversion parts are positioned away from the antenna elements in a left-right direction, and
    the predetermined sections are provided in sections from the waveguide conversion parts to the connection parts.

12. The planar antenna device according to claim 1, wherein:
    each of the first antenna and the second antenna comprises:
       a plurality of straight line parts arranged in a left-right direction; and
       a connection part connecting the plurality of straight line parts,
    the connection parts are waveguide conversion parts,
    the waveguide conversion parts are positioned away from the antenna elements in the up and down direction, and
    the predetermined sections are provided in sections from the waveguide conversion parts to the connection parts.

* * * * *